United States Patent [19]

Artin

[11] 4,095,751
[45] Jun. 20, 1978

[54] SLICING AND SHREDDING APPARATUS

[75] Inventor: Robert Lee Artin, Menomonee Falls, Wis.

[73] Assignee: Oster Corporation, Milwaukee, Wis.

[21] Appl. No.: 781,350

[22] Filed: Mar. 25, 1977

[51] Int. Cl.² ............................................. A47J 44/00
[52] U.S. Cl. .................... 241/37.5; 83/165; 222/410; 241/92
[58] Field of Search ............ 241/36, 37.5, 92, 199.12, 241/278 R, 282.1, 282.2; 222/367, 410; 83/165, 411 A, DIG. 1

[56] References Cited

U.S. PATENT DOCUMENTS

| 3,032,087 | 5/1962 | Rodwick | 241/92 |
| 3,051,401 | 8/1962 | Huck | 241/278 R X |
| 3,612,126 | 10/1971 | Emmons et al. | 241/199.12 |
| 3,612,414 | 10/1971 | Nevison et al. | 241/36 |
| 3,809,325 | 5/1974 | Marrie | 241/282.1 X |
| 3,892,365 | 7/1975 | Verdun | 241/92 |

Primary Examiner—Howard N. Goldberg
Attorney, Agent, or Firm—George R. Clark; Neil M. Rose; Clifford A. Dean

[57] ABSTRACT

An appliance for slicing and shredding vegetables, fruits, cheeses and other food products having an improved safety interlock wherein the cover for the receptacle in which the slicing and shredding is performed includes means for completing the mechanical coupling between the motor and the slicing and shredding implement. The receptacle within which the slicing and shredding is performed is provided with a novel slicing and shredding implement which cooperates with the shape of the receptacle to minimize clogging and facilitate the discharge of the sliced and shredded food from the receptacle.

15 Claims, 7 Drawing Figures

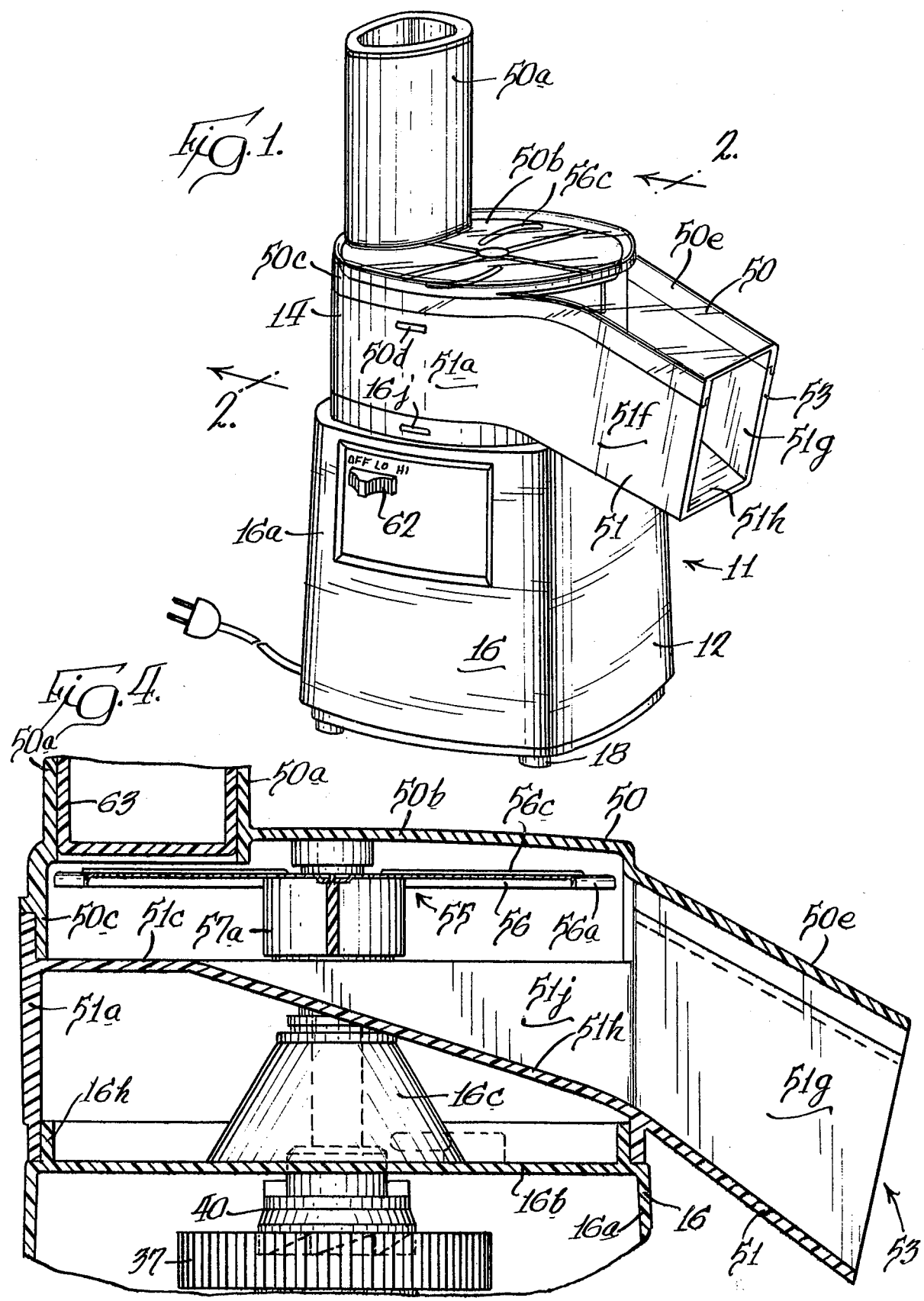

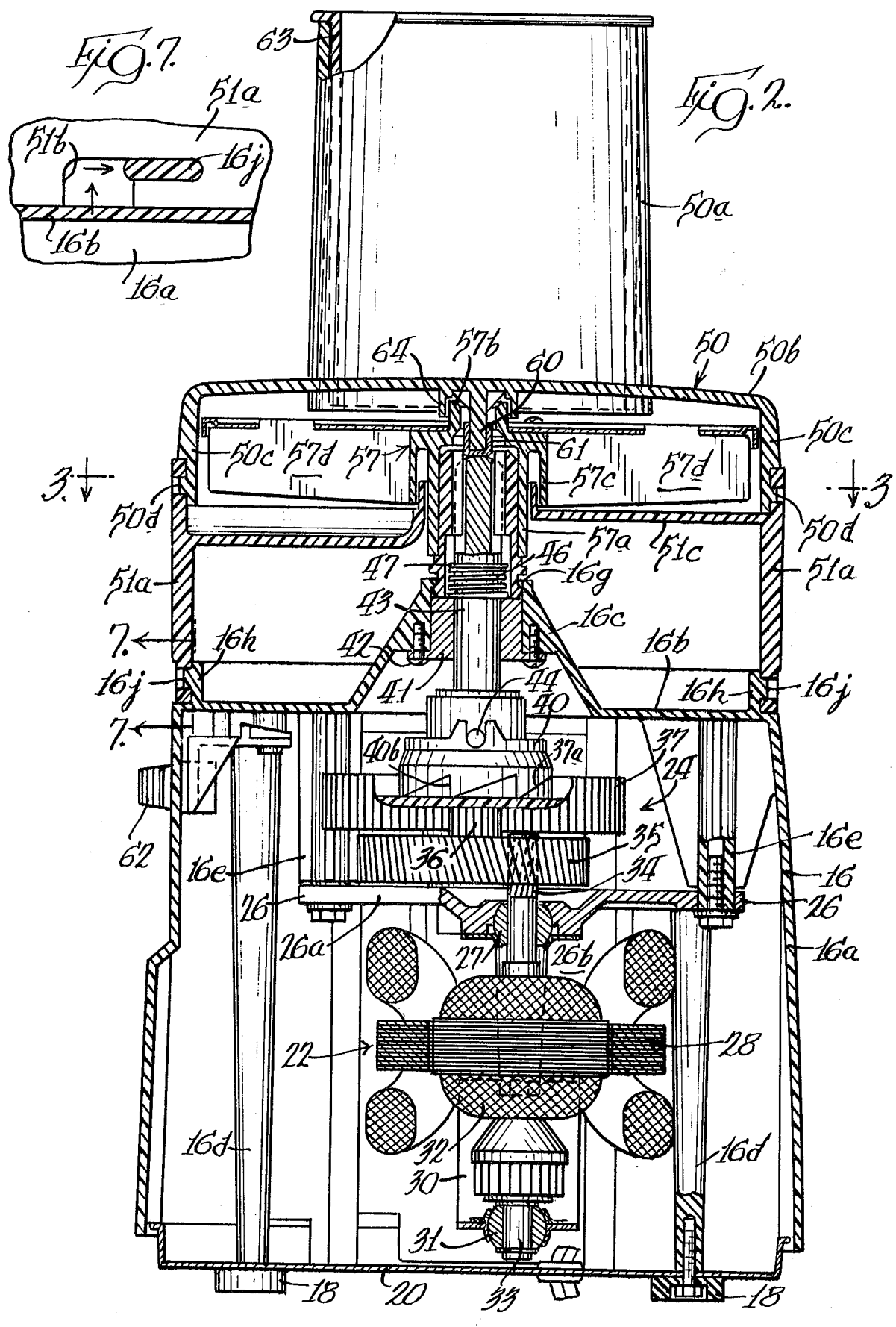

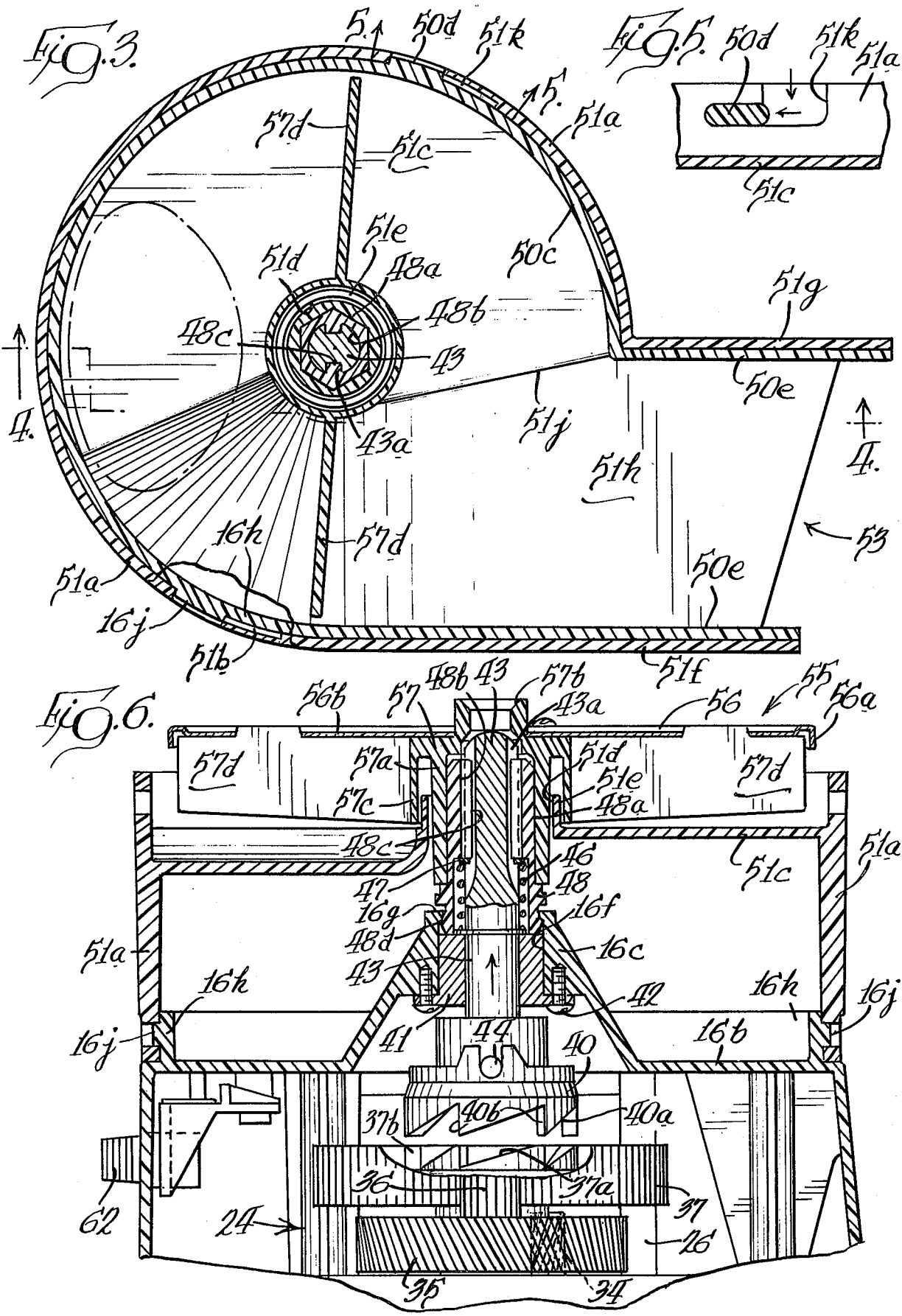

SLICING AND SHREDDING APPARATUS

BACKGROUND OF THE INVENTION

Appliances for slicing and shredding vegetables, fruits, cheeses and other foods have been well known kitchen appliances for many years. Typically, such appliances are powered by a fractional horsepower electric motor which is coupled through geared reduction means to drive slicing or shredding discs. It is conventional to provide several different types of discs or implements to enable the user to perform various types of slicing and shredding tasks. The slicing discs typically have raised blades extending generally radially with respect to the disc, such blades being formed so that there is an adjacent slot through which the sliced material passes. By having several discs with the blades spaced at different distances above the plane of the disc, foods fed into the disc from the top will be sliced in thicknesses which are directly related to the spacing of the blade above the disc. The shredding discs designed for shredding cheese, cabbage or carrots, for example, include radially extending rows of small blades formed by forming portions of the disc upwardly. The above-described types of cutting implements are common to almost all slicing and shredding appliances and serve to produce the desired types of sliced and shredded vegetables and cheeses.

As one can easily imagine, a slicing and shredding appliance is potentially very dangerous since the sharp blades on the implements might easily cut the fingers or hands of the operator if suitable safety means are not provided. In this connection, it has been conventional to provide a housing or receptacle within which the rotating implement or blade is enclosed. A suitable access or feed chute is provided, the chute being sufficiently elongated and narrow so that the fingers of the user may not easily extend into engagement with the cutting implements. At the same time, the chute permits vegetables, fruits and cheeses to be inserted and pushed into engagement with the cutting implements.

In the early days of slicing and shredding appliances, the provision of the above-described receptacle with its food insertion chute was considered to provide sufficient protection for the consumer. However, as consumers became more safety conscious and a greater appreciation was developed of the types of accidents that could occur, there was a demand for further safety means. In the earlier units, it was always possible to omit the cover for the receptacle and energize the motor, thereby rotating the cutting implements in their exposed position. In order to eliminate this possibility, various types of interlocks have been provided which prevent energization of the drive motor unless and until the cover to the receptacle is properly positioned. Examples of such prior art interlocks on slicing and/or shredding appliances are shown in the U.S. patents to Mantelet, No. 3,528,469, Marrie, No. 3,809,325, and Verdun, No. 3,892.365, and German Pat. No. 2,228,189. In the appliances disclosed in all of these patents, there is means associated with the cover for the receptacle which operates an interlock switch in series with the drive motor. Thus, until the switch is operated by the cover, the normal control for the appliance will have no effect in energizing the drive motor. Another related prior art patent is the U.S. patent to Nevison, No. 3,612,414, which is directed to a coffee mill having a mechanical interlock which is operated by the cover of the coffee mill. The application of the cover to the housing in the Nevison disclosure depresses the entire coupling and receptacle thereby permitting it to be mechanically coupled to its drive means.

Certain foods or vegetables typically sliced or shredded in appliances of the type discussed herein present greater difficulty than others insofar as proper slicing or shredding is concerned. Some foods tend to clog or jam the disc, and others are of a delicate nature and present problems insofar as discharging the sliced product without turning it into an unappetizing-looking puree. In the first category are certain types of cheese which, after being shredded, tend to reform into a homogenous mass if any amount of pressure is applied to the grated cheese. Such homogenous mass when positioned within the vessel or receptacle below the shredding disc has a tendency to jam or restrain rotation of the disc. In order to avoid this problem, it is desirable to form the receptacle and the shredding disc in such a way that the shredded material is discharged from the receptacle as quickly as possible without permitting it to jam up between the bottom of the disc and the floor of the receptacle.

Similarly, with respect to delicate foods such as sliced mushrooms and cucumbers and the like, if they are to be processed with as little distortion of the sliced vegetables as possible, they must be promptly discharged from the receptacle immediately after being sliced.

It is known in the art to provide slicing and shredding implements with fins or ribs on their lower surfaces which fins or ribs serve to push the sliced or shredded foods toward the adjacent discharge chute. Examples of such prior art slicing or shredding implements are found in the U.S. patents to Nieland, No. 2,805,697, Rodwick, No. 3,032,087, and Berland, No. 3,738,585, and British Pat. No. 1,140,669. Although these prior art patents show the use of pushers associated with the slicing or shredding implements, the housing configurations are not designed to maximize the discharge efficiency of the appliance. In all cases, the discharge chutes are located toward the outer periphery of the slicing or shredding implement and have portions of the flat bottom of the receptacle extending continuously around beneath the inner diameter of the slicing or shredding implement. As a consequence, reliance must be placed on centrifugal force to assure discharge of some of the sliced and shredded material. This leaves the possibility or likelihood that certain types of foods will not be promptly discharged from the receptacle and will either cause jamming of the slicing or shredding implement or become further distorted by remaining in the receptacle for at least one complete revolution of the cutting implement.

SUMMARY OF THE INVENTION

To prevent operation of the slicing or shredding implements in the appliance disclosed herein, a mechanical interlock is provided between the electric drive motor and the slicing or shredding discs. This interlock comprises a mechanical coupling actuated by the cover of the receptacle which has a finger extending into engagement with the top of the drive shaft to displace it downwardly and complete the drive connection. Thus, even though the drive motor may be energized when the cover to the receptacle is not in position, the cutting discs or implements will not rotate until the cover is in position to displace the drive coupling downwardly to complete the drive connection to the cutting implements.

The receptacle itself is shaped with a flat bottom over approximately half its surface with the remaining half taken up by the downwardly sloping discharge chute. The discharge chute is positioned so that its initial sloping portion adjacent the flat bottom begins in the area of the chute through which vegetables are fed into the cutting implement. The cutting implement tends to carry the sliced or shredded material a short distance in the direction of its rotation so that, as it is discharged from the cutting disc, it will fall downwardly into the sloping discharge chute. On the transition between the edge of the discharge chute and the flat bottom of the receptacle, there is a vertical and somewhat radially extending wall. Thus, food being sliced or shredded herein has a rotary component which might tend to carry the food around the receptacle again. Such food will encounter this radially extending wall and fall back into the discharge chute. The slicing and shredding implements are provided with radially extending pusher walls or ribs which occupy substantially all of the space between the lower face of the disc and the flat bottom wall of the receptacle. These walls perform a continuous pushing or sweeping action tending to prevent the build up of any food beneath the disc on the flat bottom wall area of the receptacle causing all of the food to be discharged from the chute immediately after it has been sliced or shredded.

It is, therefore, an object of the present invention to provide an improved slicing and shredding appliance having a mechanical safety interlock for the food processing receptacle.

It is a further object of the present invention to provide a slicing and shredding appliance having a clutch in the drive shaft which is operated by means on the cover of the food processing receptacle.

It is another object of the present invention to provide an improved slicing and shredding appliance having a receptacle provided with a removable cover within which slicing and shredding discs are mounted for rotation, the cover having means for engaging the drive coupling between the motor and the slicing and shredding discs.

Still another object of the present invention is to provide an improved receptacle for a slicing and shredding appliance which is formed so that foods sliced and shredded therein are discharged immediately from the receptacle as soon as they are sliced or shredded.

Another object of the present invention is to provide a receptacle within which slicing or shredding discs are mounted for rotation, such receptacle having a flat bottom portion and a discharge chute portion positioned immediately adjacent the point at which the slicing or shredding takes place.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a slicing and shredding appliance embodying my invention;

FIG. 2 is a vertical sectional view taken substantially along line 2—2 of FIG. 1;

FIG. 3 is a horizontal sectional view taken substantially on line 3—3 of FIG. 2;

FIG. 4 is a fragmentary sectional view taken along line 4—4 of FIG. 3;

FIG. 5 is a fragmentary sectional view taken on line 5—5 of FIG. 3;

FIG. 6 is a fragmentary vertical sectional view similar to FIG. 2 but showing the drive coupling in its disengaged position; and FIG. 7 is a fragmentary sectional view taken on line 7—7 of FIG. 2.

Referring to the drawings, there is shown in FIG. 1 a slicing and shredding appliance designated generally by reference numeral 11. The appliance 11 comprises a base or power unit 12 and a receptacle or vessel 14. The power unit 12 includes an inverted, cup-shaped housing 16 having generally cylindrical side walls 16a and a horizontal top wall 16b. Centrally located on the top wall 16b is a conical wall portion 16c through which the output drive from the power unit 12 extends.

The power unit 12 is provided with rubber supporting feet 18 which are secured by screws to internal bosses 16d which bosses are integrally formed with the housing 16. The bottom of the housing 16 is closed by a base plate 20 which is sandwiched between the feet 18 and the bosses 16d.

The housing 16 forms an enclosure for an electric motor 22 and a reduction gear train 24. The motor 22 and the gear train 24 are supported by means of a die-cast frame member 26 which is secured at its corners to the integrally formed housing bosses 16e. The frame member 26 has a flat portion 26a which supports at its midpoint an upper armature bearing 27. Located on opposite sides of the portion 26a are walls 26b which serve to support the motor field 28. The walls 26b, only one of which is shown in FIG. 2, merely engage the upper surface of the laminations of the field 28, which laminations are secured to the walls 26b by suitable screws. The same screws that secure the field 28 to the frame member walls 26b also secure a U-shaped yoke 30 to the field 28. The yoke 30 is a formed sheet metal member which supports a lower armature bearing 31 at its midpoint.

The motor 22 includes an armature 32 having a shaft 33 which is journaled in the bearings 27 and 31 for rotation about a vertical axis. The upper end of the shaft 33 is formed with a helical gear 34 which is positioned to engage a larger helical gear 35. The gear 35 is formed integrally with a small spur gear 36 with the gears 35 and 36 being mounted for rotation on a stub shaft carried by the portion 26a of the frame member 26. The small spur gear 36 is in driving engagement with a large spur gear 37 which comprises the output of the gear train 24 made up the gears 34, 35, 36 and 37. The output gear 37 is also mounted on a stub shaft carried by the frame member 26.

The output gear 37 is formed with a series of wedge-like drive lugs 37a, as best shown in FIGS. 2 and 6. The drive lugs 37a have vertical driving faces 37b which are adapted to drivingly engage corresponding surfaces on a coupling member 40. Thus, when the motor 22 is energized, the armature 32 drives the output gear 37 with its drive lugs 37a at a reduced speed as a consequence of the reduction taking place in the gear train 24.

The conical wall portion 16c formed in the housing 16 has an axially disposed opening 16f within which a bronze bearing 41 is mounted by means of screws 42. The bearing 41 supports a coupling shaft 43 for rotation and for axial movement. Secured to the lower end of the shaft 43 is the coupling member 40. A pin 44 press fitted in the shaft 43 drivingly engages a slot within coupling member 40 in which it is received. The coupling member 40 is press fitted on the lower end of the shaft 43 and the pin 44 assures that there will be no slippage in the driving connection between the coupling member 40 and the shaft 43. The shaft 43 is mounted for limited axial movement in the bearing 41. A helical spring 46 is positioned around the portion of the shaft 43 above the bearing 41 with the upper end of the spring 46 engaging a snap ring 47 which is received within a groove in the shaft 43, as best shown in FIG. 6. The lower end of the spring 46 engages a washer located at the top of the bearing 41. As so arranged, the spring 46 tends to urge the shaft 43 upwardly until the coupling member 40 engages the lower face of the bearing 41. In its uppermost position the coupling member 40 is completely disengaged from the output gear 37, as is best shown in FIG. 6. The coupling member 41 is formed with drive lugs 40a which have driving faces 40b which correspond in depth and spacing to the lugs 37a and drive faces 37b formed on the output gear 37. When the shaft 43 is depressed downwardly overcoming the spring 46 and compressing it, the coupling member 40 and the output gear 37 may be moved into driving connection, as illustrated by the showing in FIG. 2. For the purpose of driving the slicing and shredding implements to be described below, the shaft 43 is provided with a nylon drive member 48 which has a hexagonal outer drive surface 48a and an interior cylindrical bore 48b, as best shown in FIG. 3. To drivingly connect the shaft 43 and the drive member 48, the drive member 48 is formed with two vertically extending splines 48c which engage corresponding slots 43a in the shaft 43. The splines 48c are slidably received in the slots 43a so that the drive member 48 may remain fixed against axial displacement while the shaft 43 is axially movable.

The drive member 48 is retained against disassembly from the housing 16 by means of an overhanging flange 16g located at the top of the bore 16f. The lower end of the drive member 48 has an annular shoulder 48d which projects beneath the flange 16g, thereby capturing the lower end of the drive member 48 between the flange 16g and the bearing 41. There is sufficient clearance so that the drive member 48 may rotate freely with respect to the housing 16 when it is driven by the shaft 43.

As is best shown in FIG. 1 of the drawings, the receptacle 14 is mounted on the top of the power unit 12. This mounting is accomplished by means of a bayonet-type assembly means, part of which is formed on an upwardly extending, cylindrical wall 16h located at the outer edge of the top wall 16b of housing 16. Extending outwardly from the cylindrical wall 16h on diametrically opposite positions thereof are assembly projections 16j, one of which is best shown in section in FIG. 7. The receptacle 14 is made up of a cover 50 and a base portion 51. The base portion is formed with a generally cylindrical side wall 51a which is slightly larger in diameter than the cylindrical wall 16h so that these walls may be telescopically received, as shown in FIG. 3. The lower edge of the cylindrical wall 51a is formed with two L-shaped slots 51b which are adapted to receive the assembly projections 16j in order to provide the bayonet lock-type of assembly. The projections 16j insert into the slots 51b, as shown by the vertical arrow in FIG. 7, and then, upon rotation of the base portion 51 of the receptacle 14, the projection 16j moves laterally of the opening to the slot 51b in a position locked beneath the overhang, as shown in FIG. 7. Thus, by telescoping the cylindrical wall 51 over the cylindrical wall 16h with the parts positioned so that the assembly projections 16j enter the L-shaped slots 51b, the base portion 51 may then be rotated counterclockwise as viewed from above to engage the projections 16j in the manner shown in FIG. 7.

Located within the cylindrical walls 51a and formed integrally with the base portion 51 is a generally horizontal bottom wall 51c. As shown in FIG. 3, the bottom wall 51c extends a little more than half way around the central axis of the base portion 51. Toward the central axis of the base portion 51, there is provided an opening 51d, which opening is surrounded by an upwardly extending flange 51e.

The receptacle 14 is formed with an outlet chute 53 defined by portions of the cover 50 and the base portion 51. The base portion 51 includes a wall 51f which, as best shown in FIG. 3, extends more or less tangent to the cylindrical wall 51a and defines a part of the outer wall of the discharge chute 53. Parallel to and spaced from the wall 51f, there is provided a wall 51g on the base portion 51 which extends generally radially with respect to the central opening 51d and defines another wall of the discharge chute 53. The bottom of the discharge chute 53 is formed by a wall 51h which slopes downwardly, as best shown in FIG. 4. The inner portion of the chute bottom 51h extends downwardly at an angle of about 30° to the horizontal, whereas the outer portion extends downwardly more steeply, as is evident from FIG. 4. Extending from the inner end of the chute wall 51g is a wall section 51j, shown in both FIGS. 3 and 4. The wall 51j is generally vertical and is tangent to the flange 51e. The wall 51j serves to stop any processed food slices or the like from proceeding around the interior of the receptacle 14 and directs such food radially with respect to the receptacle and out through the chute 53.

As mentioned above, the receptacle 14 includes a cover 50 which overlies and is secured to the base portion 51. The cover 50 includes a food insertion chute 50a which extends vertically and is somewhat oval in cross section. It is sufficiently elongated with respect to the size of the opening so as to restrict entry of the hands or fingers of the user into the receptacle 14 where they might be injured by the cutting implements. The cover 50 also includes a top wall 50b which is surrounded by a shallow, downwardly extending flange 50c, the lower edge of which extends snugly within the cylindrical wall 51a. The engaging portions of flange 50c and upper portion of wall 51a are provided with bayonet locking means similar to those used in assembling the base portion 51 to the housing 16. Referring to FIG. 5 which shows the details of the assembly means, the upper edge of the wall 51a is formed with an L-shaped groove 51k which is adapted to receive a projection 50d formed on the flange 50c. Thus, as the cover is applied to the base portion 51 of the receptacle 14, the two projections 50d enter the grooves 51k, as shown by the vertical arrow, and then as the cover is rotated counterclockwise, as viewed from above, the projections 50d move into locking engagement with the overhanging portions defining the grooves 51k, as shown in FIG. 5.

Extending laterally from the top wall 50b on the cover 50 there is provided an extension wall 50e, as best illustrated in FIGS. 1 and 4, which wall defines the top wall of the discharge chute 53.

The various slicing and shredding implements usable with the appliance 11 are designed to be detachably mounted on the drive member 48 within the receptacle 14. For the purposes of illustration, a slicing implement 55 has been shown. It should be understood, however, that various other types of implements designed for shredding and other functions of this type may be utilized. The implement 55 includes a metallic slicing disc 56 which may conventionally be formed of stainless steel. The disc 56 is formed with an outer rim 56a and four radially extending grooves 56b which provide additional rigidity for the disc 56. To support the disc 56, there is provided a plastic drive member 57 which has a central hub 57a formed with a hexagonal bore dimension to fit snugly over the drive member 48 to provide the driving connection between the shaft 43 and the slicing implement 55. At the top of the hub 57a, there is an apertured boss 57b which extends through an opening provided in the center of the disc 56. Positioned outwardly of and surrounding the hub 57a is a splash guard 57c which provides an annular space between the hub 57a within which the base portion flange 51e is received, as shown in FIG. 6. This arrangement of the splash guard 57c and the hub 57 with respect to the flange 51e tends to prevent any liquids produced in the slicing and shredding process from being discharged through the opening 51d.

The plastic drive member 57 also includes radially extending plate portions 57d which serve the dual purpose of support for the disc 56 and as pushers to force the processed foods across the floor 51c to the discharge chute 53. As may be noted in FIG. 6, there is a minimum clearance between the floor 51c and the bottom edge of the plate portions 57d to prevent any food from building up beneath the slicing implement 55 where it might tend to jam or restrict the rotation thereof.

Formed integrally with the disc 56 and projecting from the upper surface thereof are slicing knives 56c. These knives, as shown in FIG. 1, may be somewhat arc-shaped in configuration to improve their slicing action and are spaced above the flat surface of the cutting disc 56 sufficiently to obtain the desired slicing thickness. The appliance 11 may be provided with many different types of alternatively usable cutting implements which provide different slice thicknesses or alternative types of shredding action.

Because of the hazards involved in using an appliance of this type, it is important that means be provided to prevent rotation of the slicing implement 55 when the cover 50 is not assembled as a part of the receptacle 14. In order to prevent such operation of the slicing implement 55 when the cover 50 is not assembled, the spring 46, described above in connection with the shaft 43, urges the shaft 43 upwardly thereby disengaging the coupling member 40 from the output gear 37. On the interior of the cover 50, there is provided a downwardly extending, centrally located projection 60 which has on its lower end a suitable bearing cap 61. The projection 60 with its bearing cap 61 is adapted to extend through the apertured boss 57b into engagement with the upper end of the shaft 43. When the cover 50 is in assembled and locked position with respect to the base portion 51, as shown in FIG. 2, the projection 60 and cap 61 extend downwardly sufficiently to urge the coupling member 40 into engaged relation to the output gear 37, as best shown in FIG. 2. The cover 50 is formed with a cylindrical flange 64 extending downwardly coaxially with said projection 60. The flange 64 surrounds the apertured boss 57b and serves as a guard to prevent liquid from being splashed into the coupling mechanism and interlock. This simple mechanical interlock provides an inexpensive and foolproof way of assuring that the slicing implement 55 will not rotate until the receptacle 14 is completely assembled to the housing 16. There are no exposed switches or switch cam members associated with the cover 50 to present problems with respect to malfunctioning from the presence of the foods being processed by the appliance. The only electrical control required for the appliance is a simple motor control switch 62, as shown in FIG. 1. In the preferred embodiment of the invention, the motor 22 is provided with a diode so that through the use of the switch 62, the motor may be operated with either one of two selected speeds. It is frequently desirable when slicing or shredding certain types of foods to conduct the operation at a slower speed.

As is conventional in an appliance of this type, the chute 50a for inserting foods is provided with a pusher member 63 which permits the user to force the food into engagement with the slicing implement without risk to the fingers.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A slicing and shredding appliance comprising a power unit having a housing within which is mounted an electric motor, an output drive member mounted on said housing for rotation about its axis, coupling means mounted in said housing and operable from outside of said housing to drivingly connect or disconnect said drive member with respect to said motor, a receptacle detachably mounted on said power unit, means for mounting cutting means on said drive member for rotation within said receptacle, a cover for said receptacle providing an enclosure having inlet and outlet openings for introducing food to be processed and for discharging sliced and shredded foods, said drive member being drivingly interconnected to said cutting means when said receptacle is assembled to said power unit so that said drive member rotates said cutting means, said coupling means being supported by said drive member and being axially displaceable, said cover having means for operating said coupling means by displacing it downwardly to drivingly connect said drive member to said motor, said drive member being disconnected from said motor until said cover is assembled to said receptacle and said receptacle is mounted on said power unit, said coupling means including a coupling shaft which is mounted in said drive member for axial movement between first and second positions with respect to said drive member and said cutting means.

2. The combination of claim 1 wherein said coupling means includes a coupling member fixed to said shaft, said coupling member being driven by said motor in said first position of said shaft and being disconnected from said motor in said second position, spring means biasing said coupling shaft to said second position, said means for operating said coupling means engaging said coupling shaft and displacing said shaft into said first position upon assembly of said cover to said receptacle.

3. A slicing and shredding appliance comprising a power unit having a housing within which is mounted an electric motor, an output drive member mounted on said housing, coupling means mounted in said housing and operable from outside of said housing to drivingly connect or disconnect said drive member with respect to said motor, a receptacle detachably mounted on said power unit and having means for mounting cutting means for rotation therein, a cover for said receptacle providing an enclosure having inlet and outlet openings for introducing food to be processed and for discharging sliced and shredded foods said drive member being drivingly interconnected to said cutting means when said receptacle is assembled to said power unit so that said drive member rotates said cutting means, said cover having means for operating said coupling means to drivingly connect said drive member to said motor, said drive member being disconnected from said motor until said cover is assembled to said receptacle and said receptacle is mounted on said power unit, said receptacle being formed with a bottom opening through which said drive member and said coupling means extend, said cutting means comprising a disc having blades thereon and formed with a mounting hub, said hub being received on said drive member to drivingly connect said disc and said drive member, said hub and disc having a central opening through which said cover means for operating said coupling means extends into engagement with said coupling means.

4. The combination of claim 3 wherein said cover is an inverted cup-shaped member having a generally circular wall which is coextensive with and spaced from said disc, said cover means comprising a downward projection in the center of said cover wall with a bearing cap on the lower end thereof, said cap being adapted to engage a rotating portion of said coupling means.

5. A slicing and shredding appliance comprising a power unit having a housing within which is mounted an electric motor, an output drive member mounted on said housing, coupling means mounted in said housing and operable from outside of said housing to drivingly connect or disconnect said drive member with respect to said motor, a receptacle detachably mounted on said power unit and having means for mounting cutting means for rotation therein, a cover for said receptacle providing an enclosure having inlet and outlet openings for introducing food to be processed and for discharging sliced and shredded foods, said drive member being drivingly interconnected to said cutting means when said receptacle is assembled to said power unit so that said drive member rotates said cutting means, said cover having means for operating said coupling means to drivingly connect said drive member to said motor, said drive member being disconnected from said motor until said cover is assembled to said receptacle and said receptacle is mounted on said power unit, said cover means for operating said coupling means comprises means on said cover which directly engages said coupling means to displace said coupling means into driven connection with said motor.

6. The combination of claim 5 wherein said coupling means includes a coupling shaft axially displaceable with respect to said output drive member, spring means biasing said shaft into a first position disengaged from said motor, said cover means for operating said coupling means comprises a projection on said cover which engages said shaft and displaces said shaft into a second position in driven connection with said motor when said cover is assembled to said receptacle.

7. The combination of claim 6 including a reduction gear train driven by said motor and having an output gear, said coupling shaft being keyed to said drive member and having a coupling member on one end thereof, in said second position of said shaft said coupling member being drivingly engaged with said output gear whereby said motor drives said drive member.

8. The combination of claim 7 wherein said power unit includes a housing within which said motor and reduction gear train are enclosed, bearing means on said housing supporting said coupling shaft for rotation and for axial movememt, said drive member being supported by said coupling shaft, spline means on said coupling shaft and drive member to provide a driving connection while permitting limited relative axial movement of said coupling shaft with respect to said drive member.

9. The combination of claim 8 wherein said drive member is formed with an annular shoulder, said housing being formed with a flange positioned adjacent and spaced from said bearing means, said annular shoulder being positioned between said flange and said bearing means to restrict said bearing means from axial movement with respect to said coupling shaft.

10. A slicing and shredding appliance comprising a power unit having a housing within which is mounted an electric motor, an output drive member mounted on said housing, a coupling means mounted in said housing and operable from outside of said housing to drivingly connect or disconnect said drive member with respect to said motor, a receptacle detachably mounted on said power unit and having means for mounting cutting means for rotation therein, a cover for said receptacle providing an enclosure having inlet and outlet openings for introducing food to be processed and for discharging sliced and shredded foods, said drive member being drivingly interconnected to said cutting means when said receptacle is assembled to said power unit so that said drive member rotates said cutting means, said cover having means for operating said coupling means to drivingly connect said drive member to said motor, said drive member being disconnected from said motor until said cover is assembled to said receptacle and said receptacle is mounted on said power unit, said coupling means including a coupling shaft which is mounted in said drive member for axial movement between first and second positions with respect to said drive member, a coupling member fixed to said shaft, said coupling member being driven by said motor in said first position of said shaft and being disconnected from said motor in said second position, spring means biasing said coupling shaft to said second position, said means for operating said coupling means engaging said coupling shaft and displacing said shaft into said first position upon assembly of said cover to said receptacle, said receptacle being formed with a bottom opening through which said drive member and said coupling shaft extend, said cutting means comprising a disc having blades thereon and formed with a mounting hub, said hub being received on said drive member to drivingly connect said disc and said drive member, said hub and disc having a central opening through which said cover means for operating said coupling means extends into engagement with said coupling shaft.

11. A slicing and shredding appliance comprising a power unit including a motor and a reduction gear train having an output gear, selective coupling means in said power unit, said coupling means including a coupling shaft having drive means on one end and a driven coupling on the other end, said coupling shaft being movable axially with respect to said drive means to engage said output gear with said driven coupling, a receptacle removably mounted on said power unit, said receptacle being cup-shaped having a cover for closing a top opening, means for mounting a cutting implement on said drive means for rotation within said receptacle, said drive means on said coupling shaft extending into said receptacle for driving engagement with said cutting implement, means on said cover engageable with said coupling shaft when said cover is in position closing said top opening to displace said coupling shaft with respect to said drive means and said cutting implement and drivingly engage said output gear and said driven coupling.

12. The combination of claim 11 wherein said output gear includes gear teeth on its periphery and a surface perpendicular to the axis having drive lugs thereon, said driven coupling having drive lugs which are engageable with the drive lugs on said output gear to drivingly connect said output gear and said coupling shaft.

13. A slicing and shredding appliance comprising a power unit including a motor and a reduction gear train having an output gear, selective coupling means in said power unit, said coupling means including a coupling shaft having drive means at one end and a driven coupling on the other end, said coupling shaft being movable axially to engage said output gear with said driven coupling, a receptacle removably mounted on said power unit, said receptacle being cup-shaped having a cover for closing a top opening and having means for mounting a cutting implement within said receptacle, said drive means extending into said receptacle for driving engagement with said cutting implement, means on said cover engageable with said coupling shaft when said cover is in position closing said top opening to displace said coupling shaft and drivingly engage said output gear and said driven coupling, said receptacle being formed with a bottom opening through which said drive means and said coupling shaft extend, said cutting implement comprising a disc having blades thereon and formed with a mounting hub, said hub being received on said drive means to drivingly connect said disc and said drive means, said hub and disc having a central opening through which said means on said cover engageable with said coupling shaft extends into engagement with said coupling shaft.

14. A slicing and shredding appliance comprising a covered receptacle including a base portion having generally cylindrical side walls interrupted by a discharge chute, said chute having one wall tangent to said side walls and a second wall parallel to said one wall and extending radially of the axis of said side walls, a cover for said base portion forming an enclosure within which a slicing and shredding disc is mounted, an annular floor in said base portion surrounding a central flange and connected to said cylindrical side walls completing said enclosure into which said discharge chute opens, said floor extending half way around said axis, said discharge chute having a bottom portion which intersects said floor at one end and angles downwardly therefrom over the length of the discharge chute, and a food insertion chute on said cover opening into said enclosure at an area diametrically across from said second wall of said chute, said base portion being formed with a separating wall which connects said discharge chute bottom with said floor and is positioned perpendicular to said floor, said separating wall being an extension of said second wall of said discharge chute.

15. The combination of claim 14 wherein said slicing and shredding disc includes a hub which supports a flat, circular member having at least one slicing blade formed thereon, integrally formed walls extending radially from said hub to the edge of said member, said radial walls on said hub extending from said member into closely spaced relation to said floor whereby said radial walls push any sliced or shredded food to said discharge chute.

* * * * *